United States Patent [19]

Gajajiva et al.

[11] Patent Number: 4,558,173
[45] Date of Patent: Dec. 10, 1985

[54] HAZARDOUS LOCATION EXPANSION FITTING

[75] Inventors: Padej Gajajiva, Fairfield; Eigil Wium, Cheshire, both of Conn.

[73] Assignee: General Signal Corporation, Stamford, Conn.

[21] Appl. No.: 412,478

[22] Filed: Aug. 30, 1982

Related U.S. Application Data

[63] Continuation of Ser. No. 401,589, Jul. 26, 1982.

[51] Int. Cl.⁴ .................................................. H02G 15/08
[52] U.S. Cl. ........................................ 174/86; 174/22 R; 174/23 R; 174/78; 285/302
[58] Field of Search ............... 174/22 R, 22 C, 23 R, 174/78, 86, 99 E, 84 S; 285/302

[56] References Cited

U.S. PATENT DOCUMENTS

| | | | |
|---|---|---|---|
| 2,208,558 | 7/1940 | Appleton | 174/23 R |
| 2,312,579 | 3/1943 | O'Brien | 174/84 S |
| 2,835,722 | 5/1958 | Appleton | 174/23 R |
| 2,900,436 | 8/1959 | Appleton | 174/86 |
| 3,093,703 | 6/1963 | Zavertnik | 174/86 |
| 3,154,632 | 10/1964 | Browne | 174/86 |
| 3,176,064 | 3/1965 | Browne | 174/78 |
| 3,188,382 | 6/1965 | Fuss | 174/22 R |
| 3,783,178 | 1/1974 | Philibert et al. | 174/86 |
| 3,974,933 | 8/1976 | Toth et al. | 174/50 X |
| 4,216,349 | 8/1980 | Wium | 174/50 |
| 4,250,350 | 2/1981 | Polimine | 174/86 |

FOREIGN PATENT DOCUMENTS 88791 4/1956 Denmark ............... 174/78

*Primary Examiner*—G. P. Tolin
*Assistant Examiner*—Morris H. Nimmo
*Attorney, Agent, or Firm*—Milton E. Kleinman; Martin LuKacher

[57] ABSTRACT

A fitting which couples two conduit members in a manner to permit relative longitudinal motion therebetween and which prevents the gases within the fitting from escaping at a temperature which might ignite an external ambient atmosphere. One form of the fitting includes a bushing affixed to an end of one of the conduit members and positioned and configured to mate with the interior of a body member affixed to an end of the other conduit member to permit sliding motion therebetween. The bushing has sufficient surface area in close proximity to the interior surface of the body member as to cause any gases passed between the bushing and body member to approach a temperature equilibrium with the body member.

8 Claims, 1 Drawing Figure

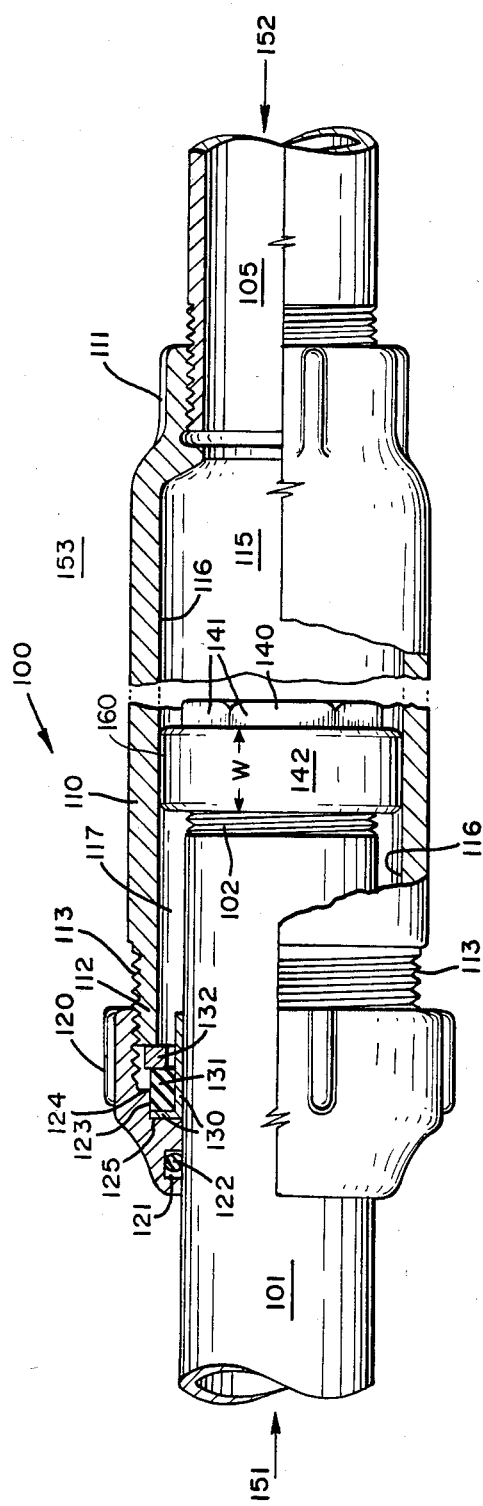

HAZARDOUS LOCATION EXPANSION FITTING

This is a continuation of application Ser. No. 401,589 filed July 26, 1982.

BACKGROUND OF THE INVENTION

As is well known, it is customary, in many situations to place electrical conductors in a metallic conduit. Lengths of conduit may be connected together and/or formed, as may be required, to provide the effect of continuous conduit over extended lengths. A wide variety of coupling and angle changing fittings are provided, as may be required, to satisfy a wide variety of circumstances. In some construction situations, it is possible for two pieces of conduit to experience relative motion in a longitudinal direction. Unless special provisions are made, and unless the relative motions are very small, such motion may damage the conduit and/or fittings to which they are attached. Some of the more common and/or obvious situations wherein relative longitudinal motion may occur are on bridges which may rise and fall with temperature and load variations; interconnections between two buildings which may sway in response to wind loading; and situations wherein the ambient temperature of the conduit may be exposed to wide variations. Other situations will readily occur to those experienced in the art.

The industry has provided a variety of expansion fittings for use in these and other circumstances. For example, reference may be had to U.S. Pat. No. 3,154,632 issued Oct. 27, 1964 to F. L. Browne; U.S. Pat. No. 3,783,178 issued Jan. 1, 1974 to Robert A. Philibert, et al. and U.S. Pat. No. 4,250,350 issued Feb. 10, 1981 to Robert F. Polimine, all of which are assigned to the present assignee. Typically, the expansion fittings of the type described in the aforementioned patents will accommodate relative conduit movement of at least plus or minus four inches. The various cited patents, among other things, deal with means for providing superior grounding continuity between the two sections of conduit.

Another situation with which those familiar with the art are all too familiar are the dangers presented when the atmosphere within the conduit, and/or external to the conduit, may contain an explosive atmosphere. The explosive atmosphere may be unavoidable or unintentional and may result from various gases, vapor, dust, lint or other substances. As those familiar with the installation of electrical conduit are well aware, it is quite possible for the conduit to serve as a transmission path of an explosive atmosphere from one location to another. To prevent such transmission of explosive atmospheres, and/or to limit the propagation of products of combustion resulting from combustion and/or an explosion devices of the type indicated in U.S. Pat. No. 4,216,349 issued Aug. 5, 1980 to E. Wium have been designed. U.S. Pat. No. 3,974,933 issued Aug. 17, 1976 to Maria Toth, et al discloses another structure designed to contain and limit the effects of explosions ignited by electrical sparks.

Prior art expansion fittings provided the expansion feature but did not include means for preventing the escape of hot gases resulting from a explosion within the conduit.

There is at least one expansion fitting available in the market place that is designed for use in hazardous locations. This fitting is intended to prevent any exploded gases within the fitting from escaping at a tempearature which would ignite the atmosphere external to the fitting. The commercially available fittings, known to applicant, are relatively costly and permit a maximum expansion of only approximately 1.25 inches, an amount which is not comparable with the eight or more inches provided by the expansion fittings of the cited prior art patents. U.S. Pat. No. 2,900,436 issued Aug. 18, 1959 to A. I. Appleton describes this fitting. The patented fitting is not liquid tight and as a result, the critical surfaces may be exposed to corrosive atmospheres. In addition, the grounding technique described could damage the interior surface and permit rapid escape of hot gases.

Prior art techniques for confining hot gases and/or providing for relatively large longitudinal movement includes formation of a large "U" bend in the conduit or perhaps the use of a full circle. These techniques require costly flexible couplings.

Another technique was to use an expansion fitting of the type disclosed in one of the cited patents and near each end thereof provided a seal similar to that of the cited Wium patent. This combination is fraught with danger as longitudinal movement of the conduits could result in one or both of fractured seals and rupture of the conductor due to tension.

SUMMARY OF THE INVENTION

The structure of the present invention uses some elements similar to those of the prior art expansion fittings. However, the body member is modified by having the inside diameter reamed to a carefully controlled dimension. The conduit which fits within the body member, and moves longitudinally with respect thereto, has affixed to its end, a metallic bushing having a smooth outer diameter machined to a value which is only slightly less than the reamed diameter of the body member. Typically, the bushing is also provided with a portion containing flats for the purpose of wrench tightening the bushing onto threaded conduit.

Alternately, the conduit could be of a predetermined diameter to mate with the passage through the head. This is generally inferior as the conduit would be exposed to external atmosphere and/or mechanical damage.

The body member and all associated parts are designed to withstand an accidental internal explosion and if such explosion should occur, the pressure within the fitting will exceed the external atmospheric pressure and there will be a tendency for the hot gases within the fitting to attempt to escape by passing between the smooth surface of the bushing and that of the body member. Because the body member will be at a temperature substantially equal to the external ambient temprature and because of the small space between the bushing and the reamed interior of the body member and because of the surface area of the bushing proximate to the body member, any gas which is transferred through the space between the bushing and the body member will be cooled to a temperature insufficient to ignite an explosive atmosphere. Gases from within the conduit and fitting may also escape through the threaded joint between the conduit and the body member. This is acknowledged as being acceptable for the application as the gases will be adequately cooled prior to emergence to the atmosphere.

It is an object of this invention to provide an expansion fitting with all of the characteristics and features of prior art expansion fittings and to provide a structure which will be satisfactory for use in hazardous locations.

It is a more specific object of the invention to provide an expansion fitting wherein gases escaping from the interior, due to an explosion, will be cooled to such an extent that they will be incapable of igniting an explosive atmosphere, when and if they escape from the fitting.

It is another object of the invention to cause any escaping gases to be cooled by the close proximity of metallic surfaces which comprise the escape route.

It is another object of the invention to provide a fitting having the described characteristics and which is liquid tight and provides ground continuity.

It is another object of the invention to provide a structure of the character recited which is reliable in performance, economical to manufacture, and convenient to assembly and use.

BRIEF DESCRIPTION OF THE DRAWING

To permit incisive and detailed analysis of the operational characteristics of this invention, a drawing illustrating specific structural characteristics is provided. This drawing discloses one form of the invention and is not meant, in any way, to delimit its scope, it is rather so drawn as an aid in an understanding of the invention.

The drawing shows a partial cut away view of one form of an expansion fitting for connecting two sections of rigid conduit and which provides a means for cooling the gases of the product of combustion within the conduit before they an escape to the external atmosphere.

DESCRIPTION OF THE PREFERRED EMBODIMENT

The cited patents relating to expansion connectors disclose a variety of techniques for providing ground continuity between the two pieces of conduit coupled to the expansion joint. The expansion joint used in connection with the present invention may incorporate any one of these ground continuity techniques and/or other techniques. For convenience, the grounding technique indicated in FIG. 1 of cited U.S. Pat. No. 3,783,178 is illustrated herein. However, it should be understood that any other expedient form of ground continuity may be employed.

It is believed that the invention, together with its structural parts and their interaction, one with the other, can best be understood from a consideration of the drawing taken together with the following specification. For convenience, elements of this drawing which have corresponding elements in the drawing of FIG. 1 of U.S. Pat. No. 3,783,178 have been given corresponding element numbers. 100 represents the expansion fitting generally which serves to couple together two sections of rigid conduit 101 and 105. It should be understood that a modified version of the expansion fitting 100 could be employed for coupling a section of rigid conduit 101 to some other member, such as a wall member (not shown) instead of to a second section of rigid conduit 105. The expansion fitting 100 includes a generally cylindrical body section 110 which, at one end 111, is suitably formed to facilitate connection to rigid conduit 105 or some other member as may be expedient. The method of joining the conduit 105 or other member to the end 111 of body section 110 will normally comprise a technique which does not admit of relative longitudinal motion between the two elements after the joining has been completed. Such technique may involve an external thread; an internal thread, as illustrated, or might comprise any suitable form of fitting, such as welding, soldering or brazing or joined flanges, etc. The joint will typically comprise a technique through which gases interior of the fitting 100 and subjected to greater than atmospheric pressure may be able to escape in a slow and controlled manner.

Although such would not normally be the case, the coupling at end 111 of the body section 110 could be of the same general character as the type to be described with respect to the end 112 of the body section 110.

The end 112 of the body section 110 is threaded with threads 113 to the facilitate the coupling of the head 120 to the body section 110. As may be seen, the head member 120 has a first recessed area 121 which is adapted to retain an O-ring 122 which may be coated with a silicon grease. The dimension of the recess 121 and the O-ring 122 inserted therein are such that when a section of rigid conduit 101 is inserted through the opening of the head 120, there will be a sealing connection between the O-ring 122 and the conduit 101 for excluding water and/or atmospheric contaminants from entering the interior of the body section 110. The recess 121 has a dimension parallel to the longitudinal direction of the rigid conduit 101 which is greater than the diameter of the material of the O-ring 122 in order to facilitate compression and/or rolling motion of the O-ring 122 in response to relative longitudinal motion between the rigid conduit 101 and the head 120.

There is another recess 123 in the head 120 which serves a function to be described herein below. The interior of the head 120 is threaded to mate with the threads 113 of the body section 110. It should be observed that the recess 123 has a lesser diameter than the threaded section of the head 120 thereby forming a wall, or step, 124 between the recess 123 and the threaded section of the head 120. Accordingly, it will be evident that it will be impossible to thread the body section 110 and the end 112 thereof, into the head 120 any further than the wall 124. Accordingly, the recess 123 cannot be reduced below a predetermined volume which is a function of the various dimensions. Contained within the recess 123 is a grounding ring 130 which may be of the type more fully described in the cited patent. Surrounding a portion of the grounding ring 130 is a compression grommet 131 which fits into the recess 123. Between the compression grommet 131 and the end 112 of the body section 110 is a pressure ring 132. As the body section 110 is screwed into the head section 120, the end 112 of the body section 110 will push the pressure ring 132 against the compression grommet 131 thereby squeezing the compression grommet 131 into the recess 123 and increasing the pressure of the grounding ring 130 against the rigid conduit 101 and against the wall 125 of the recess 123. By controlling the dimension of the recess 123 and the dimensions and material of the compression grommet 131, it is possible to control the maximum pressure that will be applied between the grounding ring 130 and the conduit 101.

The body member 110 is shown with a discontinuity in order to illustrate the fact that the interior chamber may have any desired length between ends 111 and 112.

The interior chamber 115 includes surface 116 which is normally cylindrical and reamed to a relatively smooth and controlled diameter.

The conduit 101 has threads 102 at the end thereof which is inserted through a passage in the head 120 into the body member 110. After the conduit is passed through the head 120, a bushing 140, which has threads for mating with threads 102 of the conduit 101, is coupled to the conduit 101. Thereafter the head 120 is coupled to the body member 110 by threads 113. The bushing 140 may be coupled to the conduit 101 by means of a wrench placed on the flats 141 which comprise a portion of the bushing 140. The major portion 142 of the bushing 140 is configured to fit within the body 110 with relatively little clearance therebetween. The difference in the diameters may be of the order of 0.002 inches. The major portion 142 of the bushing 140 will have a width W which will control a characteristic of the fitting 100 to be described more fully hereinbelow. From the description, as thus far described, it will be seen that the bushing 140 may move back and forth within the interior 115 of the body member 110 in a manner somewhat analagous to that with which a piston moves within its chamber. The bushing 140 divides the chamber in the body member 110 into two spaced subchambers and provides a through passage 160 therebetween.

It will be appreciated that the conduits 101 and 105 are hollow and that the bushing 140 has a central passageway therethrough in order to accommodate conductors (not shown) which may be fed through the conduits 101 and 105. The conduits 101 and/or 105 may couple to other conduit members and ultimately be open to atmospheres which may differ materially from that surrounding the expansion fitting 100. Thus, there may be an atmosphere 151 transmitted through the conduit 101 to the chamber 115 and/or an atmosphere 152 transmitted through conduit 105 to the chamber 115. Either of these atmospheres 151 and/or 152 may or may not differ materially from the atmosphere 153 surrounding the fitting 100. If there is a possibility that the atmosphere 153 could comprise an explosive atmosphere, it could be extremely dangerous to have an atmosphere within the chamber 115 ignited by any set of normal or abnormal circumstances if the hot gases resulting from such explosion within the chamber 115 could escape to the atmosphere 153 at a temperature which could ignite the atomsphere 153. The present structure is provided to protect against this untoward circumstance and to render any escaping gases incapable of igniting the atmosphere 153. First and foremost, the expansion fitting 100 and the conduits 101 and 105, and all associated parts, must be constructed of material which is sufficiently strong to prevent rupture in response to an internal explosion. Furthermore, the hazardous location expansion fitting 100 must be constructed in a manner to prevent the escape of gases from the chamber 115 at a temperature sufficiently high to ignite the atmosphere 153.

There are two general escape routes for gases in the chamber 115 to the atmosphere 153. These are through the threads joining conduit 105 with end 111 of body member 110 and between the bushing 140 and the body 110 and subsequently through any of a variety of escape routes to the atmosphere 153. The escape through he threaded joint is recognized as being capable of permitting such a slow escape as to be able to cool the escaping gases below a temperature which would be capable of igniting the atmosphere 153. This is because the end 111 of the body member 110 has sufficient mass that it will be close to the ambient temperature of the atmospheres 153 and therefore, because of the relatively slow progress of the escaping gases through the threaded connection, such escaping gases will be cooled to near that of the ambient atmosphere 153 by the time they escape to the atmosphere 153. With the temperature reduced, as described, the escaping gases cannot ignite an explosive atmosphere 153. It will be recalled that the bushing 140 has a diameter which is only slightly less than the internal diameter of the chamber 115 and therefore, any hot gases within the chamber 115 which escape through the space (the leakage control passage) separating the bushing 140 and the body member 110 will pass therebetween relatively slowly and have ample time to be cooled by the ambient temperature of the body member 110 provided the longitudinal length W of the bushing 140 is sufficient. That is, the longitudinal length W of the bushing 140 must have a value which is sufficient to assure reduction of the temperature of escaping gases. The width which may be required will be a function of several factors including, but not limited to, the possible nature and temperature of the atmosphere 153, the maximum pressure differential between the chamber 115 and the atmosphere 153, the possible temperature of gases within the chamber 115 and the maximum spacing which may exist between the bushing 140 and the wall 116 of the body member 110. The maximum temperature and pressure differential are most likely to exist subsequent to ignition of gases in chamber 115.

The relationship of the bushing 140 with the interior surface 116 of the body member 110 was previously alluded to as being analogous to that of a piston in its chamber. Indeed, the fitting 110 could be fabricated with the bushing 140 having piston rings somewhat in the manner of the pistons of an automobile. The piston rings could comprise a set of closed rings and/or a spiral ring. In either event, the rings must be formed and shaped to prevent the rapid transmission of gases from the chamber 115 towards the exterior atmosphere 153. Piston rings, if used, could float in radial grooves on the bushing 140 and be biased radially outward.

As thus far described, the bushing 140 and the interior of the body member 110 are cylindrical. With this shape, it is evident that the conduit 101 could have rotational motion relative to the conduit 105. If such motion is not to be encountered and/or may not be tolerated, the bushing 140 (or the piston rings, if used) could have a mating relationship with the interior surface 116 of the body member which is other than cylindrical.

As previously stated, the separation between the outer surface 142 of the bushing 140 and the interior surface 116 of the body member 110 should be of the order of 0.002 inches. The surfaces should be smooth and would normally be lightly lubricated to facilitate the required sliding motion and to inhibit rust. If desired, or required by other circumstances, the bushing 140 and/or surface 116 may have a special finish including plating.

Reference has already been made to U.S. Pat. No. 3,783,178. The cited patent teaches the use of a stop collar 242 as shown in FIG. 2 of that patent. The fitting 100 could include a similar stop collar if circumstances and the operating conditions thereof warranted.

It will be appreciated that an alternate structure could be fabricated wherein the conduit 101 has a carefully controlled diameter as would a mating surface of the head 120. This might be used in addition to, or in place of, the mating relationship of surfaces 142 and 116. However, the mating relationship of the conduit and head exposes the conduit to possibly corrosive atmospheres and/or mechanical damage. Accordingly, use of the bushing 140 are reamed surface 116 is a preferred embodiment.

While there has been shown and described what is considered at present to be the preferred embodiment of the invention, modifications thereto will readily occur to those skilled in the related arts. For example, in another structure, relative proportions could be modified, and other grounding techniques might be employed. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modification as fall within the true spirit and scope of the invention.

What is claimed is:

1. A hazardous location expansion fitting comprising
   (a) a metallic body having a first end suitably configured for rigid coupling to a first member by means for preventing the rapid ingress or egress of the external or internal gases, respectively, through said rigid coupling;
   (b) a head member coupled to a second end of said metallic body member and suitably configured with a passage therethrough for a liquid tight relationship with a conduit member placed therethrough;
   (c) said metallic body member having an interior chamber with a uniform cross section for at least a portion of the length of said body member, said interior chamber having a diameter greater than that of said passage through said head member;
   (d) a metallic bushing having a first outer surface configured to mate with said uniform cross section of said interior chamber of said body member and said bushing dividing the interior chamber into two spaced subchambers, said bushing defining with said body member a leakage control through passage from one of the two subchambers to the other subchamber of sufficiently small size and sufficiently great length said through passage being in heat transfer relationship with said body member to cool the gases passing through said leakage control through passage below explosion igniting temperature; and wherein
   (e) said bushing includes coupling means for coupling it to an end of said conduit member which enters said body member from said second end thereof and through said passage through said head member whereby the end of said conduit member which is coupled to said bushing is positioned interior of said body member and can reciprocate with respect to said head member and said body member and concomitantly cause said bushing to reciprocate with respect to said body member.

2. The fitting as set forth in claim 1 wherein said first outer surface of said bushing mates with the interior chamber of said body member so closely as to inhibit the rapid transfer of gases through said leakage control through passage from one side of said bushing to the other.

3. The fitting as set forth in claim 2 wherein said bushing coupling means includes interior threads.

4. The fitting as set forth in claim 3 wherein said bushing includes a second outer surface portion containing flats for the purpose of wrench tightening said interior threads of said bushing coupling means onto a threaded end of said conduit member.

5. The fitting as set forth in claim 2 wherein said first outer surface of said bushing has sufficient surface area that any gases transferred from one side of said bushing to the other, in response to a difference of atmospheric pressure between the two sides, will tend to be brought to a temperature differential insufficient to ignite an external explosive atmosphere.

6. The fitting as set forth in claim 5 wherein the limits of excursion of said bushing within said interior chamber is a function of the length of said chamber which ranges from a few to several times the longitudinal length of said bushing.

7. The fitting as set forth in claim 5 and including means for providing a gounding connection between said body member and conduit member coupled to said bushing.

8. The fitting as set forth in claim 7 wherein said grounding connection is independent of said first outer surface of said bushing and said surface of said interior chamber.

* * * * *